United States Patent
Schumacher

(10) Patent No.: US 10,955,152 B2
(45) Date of Patent: Mar. 23, 2021

(54) DEVICE FOR AIR-CONDITIONING STALLS

(71) Applicant: Barnstorfer Kunststofftechnik GmbH & Co. KG, Barnstorf (DE)

(72) Inventor: Egon Schumacher, Barnstorf (DE)

(73) Assignee: Barnstorfer Kunststofftechnik GmbH & Co. KG, Barnstorf (DE)

( * ) Notice: Subject to any disclaimer, the term of this patent is extended or adjusted under 35 U.S.C. 154(b) by 85 days.

(21) Appl. No.: 16/278,062

(22) Filed: Feb. 16, 2019

(65) Prior Publication Data
US 2019/0277518 A1 Sep. 12, 2019

(30) Foreign Application Priority Data
Mar. 8, 2018 (DE) .......................... 202018001233.5

(51) Int. Cl.
*F24F 5/00* (2006.01)
*F24F 1/0007* (2019.01)
*F24F 6/04* (2006.01)
*A01K 1/00* (2006.01)
*F24F 6/14* (2006.01)

(52) U.S. Cl.
CPC .......... *F24F 5/0035* (2013.01); *A01K 1/0082* (2013.01); *F24F 1/0007* (2013.01); *F24F 6/04* (2013.01); *F24F 6/14* (2013.01)

(58) Field of Classification Search
CPC .......... F24F 5/0035; F24F 6/04; F24F 1/0007; F24F 6/14; A01K 1/0082
See application file for complete search history.

(56) References Cited

U.S. PATENT DOCUMENTS

| | | | | | |
|---|---|---|---|---|---|
| 2,522,600 | A | * | 9/1950 | Brookins | F24F 6/04 239/193 |
| 4,045,523 | A | * | 8/1977 | Goettl | B01D 1/26 261/97 |
| 4,361,525 | A | * | 11/1982 | Leyland | F24F 6/04 165/60 |
| 4,499,031 | A | | 2/1985 | Sexton | |

(Continued)

FOREIGN PATENT DOCUMENTS

| | | |
|---|---|---|
| DE | 1242649 B | 6/1967 |
| WO | 99/36739 A1 | 7/1999 |

OTHER PUBLICATIONS

Deutsches Patent—Und Markenamt (German Patent and Trademark Office), Recherchebericht (search in a related application), dated Aug. 30, 2018.

(Continued)

*Primary Examiner* — Kun Kai Ma
(74) *Attorney, Agent, or Firm* — Laurence P. Colton; Smith Tempel Blaha LLC

(57) ABSTRACT

In devices for air-conditioning stalls having evaporation members which can be supplied with fluid by means of spray pipes which are arranged thereabove, the deflectors are provided above the spray pipes, which deflectors have to be removed for cleaning purposes and temporarily stored elsewhere, which is complex and can lead to damage to the deflectors. The disclosed device for air-conditioning stalls has a provision for deflectors to have hinge connections to retention members. The deflectors can thereby be pivoted upwards in order to clean spray pipes without the deflectors having to be completely removed from the retention members.

12 Claims, 4 Drawing Sheets

(56) References Cited

U.S. PATENT DOCUMENTS

| | | | | |
|---|---|---|---|---|
| 4,752,419 A * | 6/1988 | Sperr, Jr. | F24F 6/04 261/106 |
| 4,933,117 A * | 6/1990 | Wilson | F24F 5/0035 261/106 |
| 4,939,907 A * | 7/1990 | Taylor | F24F 5/0035 62/95 |
| 5,606,868 A * | 3/1997 | Calvert | F24F 5/0035 239/145 |
| 5,765,635 A * | 6/1998 | Rhee | B60H 1/00742 165/203 |
| 5,971,370 A * | 10/1999 | Galabinski | F24F 5/0035 261/106 |
| 6,367,277 B1 * | 4/2002 | Kinkel | F24F 5/0035 261/98 |
| 2003/0001294 A1 * | 1/2003 | Permenter | B01F 3/04021 261/97 |
| 2005/0012230 A1 * | 1/2005 | Kammerzell | F24F 5/0035 261/98 |
| 2005/0029371 A1 * | 2/2005 | Kucera | F24F 5/0035 239/590 |
| 2007/0163280 A1 * | 7/2007 | Meerpohl | F24F 5/0035 62/310 |
| 2008/0018001 A1 * | 1/2008 | Kammerzell | F24F 6/043 261/97 |
| 2013/0047641 A1 * | 2/2013 | Townsend | F24F 5/0035 62/92 |
| 2014/0144171 A1 * | 5/2014 | Smith | F28C 3/08 62/304 |
| 2018/0172327 A1 * | 6/2018 | Christians | F28D 5/02 |

OTHER PUBLICATIONS

European Patent Office, Europaischer Recherchebericht (search in a related application), dated Jul. 15, 2019.

* cited by examiner

DEVICE FOR AIR-CONDITIONING STALLS

CROSS REFERENCE TO RELATED APPLICATIONS

This patent application claims priority on and the benefit of German Patent Application No. 20 2018 001 233.5 having a filing date of 8 Mar. 2018.

BACKGROUND OF THE INVENTION

Technical Field

The invention relates to a device for air-conditioning stalls, in particular for cooling and/or humidifying stall air, with evaporation members, at least one spray pipe which is arranged thereabove and which can be supplied with fluid, at least one deflector above the at least one spray pipe and retention members for the at least one spray pipe and the at least one deflector above the evaporation members.

Prior Art

Devices of this type have pad-like evaporation members which are erected to form a type of wall and which are sprinkled from above with a fluid, in particular water. Only water will be mentioned below, but this is not intended to exclude the use of other fluids. Water which is sprinkled into, but where applicable also down on the evaporation members is evaporated by the thermal energy in the ambient air. In this instance, air, in particular stall air, is cooled and at the same time humidified.

At least one spray pipe which can be supplied with water is arranged above the evaporation members which are preferably arranged so as to be orientated longitudinally and upright one behind the other. There is associated with the at least one spray pipe a deflector which redirects and distributes fine liquid jets discharged from the spray pipe in such a manner that the evaporation members are acted on with water from above in a uniform manner, in particular over the entire surface, via the longitudinally directed upper end wall thereof.

The deflector and the at least one spray pipe are secured to retention members which are arranged with spacing above the evaporation members. The deflector is releasably connected to the retention members so that an intermediate space between the deflector and the at least one spray pipe can be cleaned. It has been found that releasing the deflector from the retention members and the subsequent suspension for again fixing the deflector to the retention members is complex and can also lead to damage to the retention members and/or the deflector. Furthermore, the cleaning is difficult since the at least one spray pipe and the deflector have to be cleaned separately after release from the retention members.

BRIEF SUMMARY OF THE INVENTION

An object of the invention is to provide a device for air-conditioning stalls, in particular for cooling and/or humidifying stall air, which enables simple access to a space between the respective deflector and the at least one spray pipe, preferably for cleaning purposes.

A device for solving this problem is a device for air-conditioning stalls, in particular for cooling and/or humidifying stall air with evaporation members, at least one spray pipe which is arranged thereabove and which can be supplied with fluid, at least one deflector above the at least one spray pipe and retention members for the at least one spray pipe and the at least one deflector above the evaporation members, characterised in that the or the respective deflector can be secured to the retention members with at least one of the opposing longitudinal edge regions thereof by means of at least one releasable hinge connection, wherein the at least one releasable hinge connection is constructed to pivot the or the respective deflector relative to the retention members which carry it. Accordingly, the or each deflector can be connected to the retention members by means of a releasable hinge connection on at least one of the opposing longitudinal edge regions thereof. The at least one releasable hinge connection is constructed to pivot the respective deflector relative to the retention members which carry it. Only one longitudinal edge of the respective deflector thereby needs to be released from the retention members associated therewith in order to obtain access to the space between the respective deflector and the at least one spray pipe. The space between the at least one spray pipe and the respective deflector is accessible without having to remove the deflector from the retention members. The respective deflector needs only to be pivoted about a pivot axis in order to make the at least one spray pipe accessible from above. Furthermore, the at least one pivot axis ensures that the respective deflector remains connected to the retention members after being pivoted upwards. It is thus possible for the at least one spray pipe which is connected to the retention members and the respective deflector which is also connected to the retention members to be cleaned at the same time.

There is preferably provision for the at least one deflector to have hinge connections at both opposing longitudinal side edges, preferably identical hinge connections. In particular, the at least one deflector can be pivoted relative to the retention members selectively about one of the two hinge connections.

In a preferred embodiment of the device, the releasable pivot connections act at the same time as locking and/or plug type connections and as hinges for folding open and closed the at least one deflector. The hinge connections thereby have a dual function in that they, on the one hand, serve to releasably connect each longitudinal edge of the or the respective deflector to the retention members and, on the other hand, optionally one hinge connection is releasable, whilst the other remains closed in order to pivot the respective deflector, in particular to pivot it upwards and subsequently to pivot it back again. The deflector can thus be pivoted about either one or the other hinge connection, depending on the location from which the space between the deflector and the at least one spray pipe is intended to be opened.

According to an advantageous embodiment, there is provision, in order to form a movable portion of each hinge connection on at least one longitudinal edge region, preferably both longitudinal edge regions, of the respective deflector for an externally mainly cylindrical longitudinal edge profile to be provided. Consequently, both a hinge and a locking and/or plug type connection can be formed. Such hinge connections can be formed in a simple manner and ensure a large degree of flexibility when opening and closing the space between the at least one spray pipe and the deflector which is associated therewith in each case.

Preferably, the counter-piece to the movable portion of each hinge connection, that is to say, a fixed portion thereof, is formed on the respective retention member for both the at least one spray pipe and the or each deflector. The fixed portion of each hinge device is formed by receiving pockets, preferably at opposing sides of the respective retention member. With the receiving pockets of the retention members, the longitudinal edge profiles of the respective deflector can be readily releasably connected by means of plugging together or locking and the respective longitudinal edge profile on the relevant deflector can further be rotated in the receiving pockets of the retention members. The receiving pockets of the retention members which are successive with spacing thereby form a hinge with the associated cylindrical longitudinal edge profile of the deflector.

A preferred embodiment of the device makes provision for the longitudinal edge profiles of the respective deflector to correspond to the two receiving pockets of the respective retention member in such a manner that the longitudinal edge profiles can be pressed into the receiving pockets of the retention members in a locking manner. Alternatively or additionally, there is provision to construct a longitudinal edge profile which is provided at the outer side on at least one longitudinal edge region of the respective deflector so as to correspond to the receiving pockets of the respective retention member in such a manner that the at least one longitudinal edge profile can be rotated about the longitudinal centre axis thereof in the receiving pockets of the retention members.

According to an advantageous development of the device, it is possible for the or the respective deflector to be able to be independently locked at least in the state pivoted upwards. The deflector which is folded upwards thereby maintains its position. In particular, the deflector is thereby prevented from not being folded further open and/or from being folded back in an undesired manner into the closure position thereof when the at least one spray pipe and/or the respective deflector is/are cleaned with a water jet or the like.

Preferably, the locking of the respective deflector in at least one position folded upwards is carried out at the hinge connection which acts as a hinge when the deflector is pivoted and which is not separated during opening. The locking is to this end preferably integrated in the hinge connection. Such a locking can be readily formed. It requires no additional components.

The locking of the respective deflector in at least one position folded upwards may be integrated in the respective hinge connection by the respective longitudinal edge profile on the or each deflector having at least one projection. This projection corresponds either to a longitudinal edge of the receiving pockets of the retention members associated with the deflector or to a corresponding recess in the receiving pockets. On the respective hinge connection, at least with the deflector in the state folded upwards, a projection at the outer side on the longitudinal edge profile then comes into engagement with the longitudinal edges of the receiving pockets or a corresponding recess in the receiving pockets. This leads to an almost positive-locking blocking of the hinge connection with the longitudinal edge profile no longer being able to be pivoted in the receiving pockets as long as the projection engages in recesses or is in abutment with the longitudinal edges. By means of resilient deformation of the receiving pockets, in order to move the respective deflector back into the closed operating or starting position thereof, the locking can be released. In this instance, there may be provision in the closed operating position of the respective deflector for the projection of the cylindrical longitudinal edge profile to engage in recesses of the receiving pocket of the respective retention member. This additionally secures the respective deflector in the pivoted-back, closed operating position thereof.

BRIEF DESCRIPTION OF THE DRAWINGS

A preferred embodiment of the device is explained in greater detail below with reference to the drawings, in which.

DETAILED DESCRIPTION OF PREFERRED EMBODIMENTS

Figure 1:
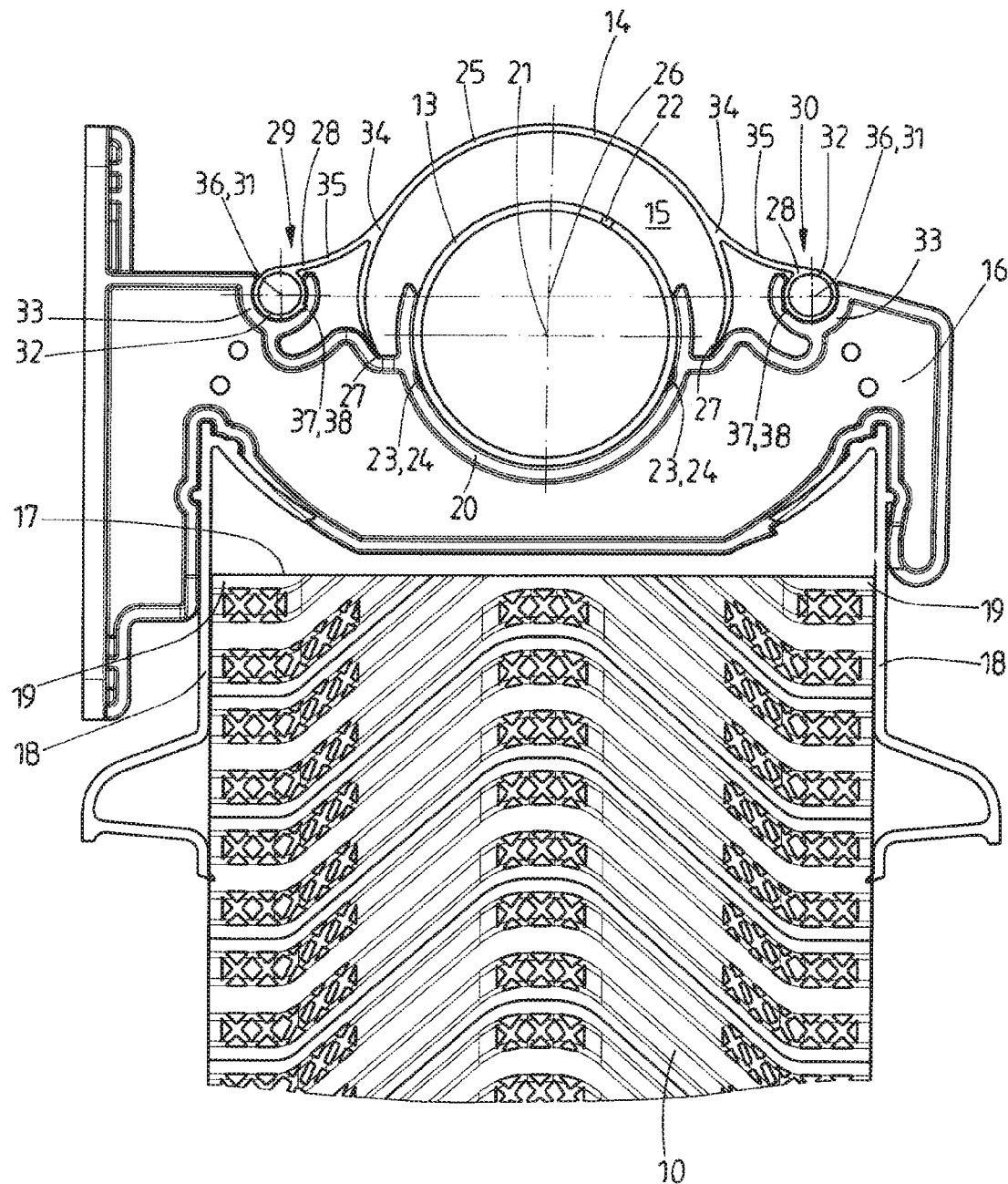
FIG. 1 is a cross-section through the upper portion of the device in the region of a spray pipe and a deflector which is associated therewith.
Figure 2:
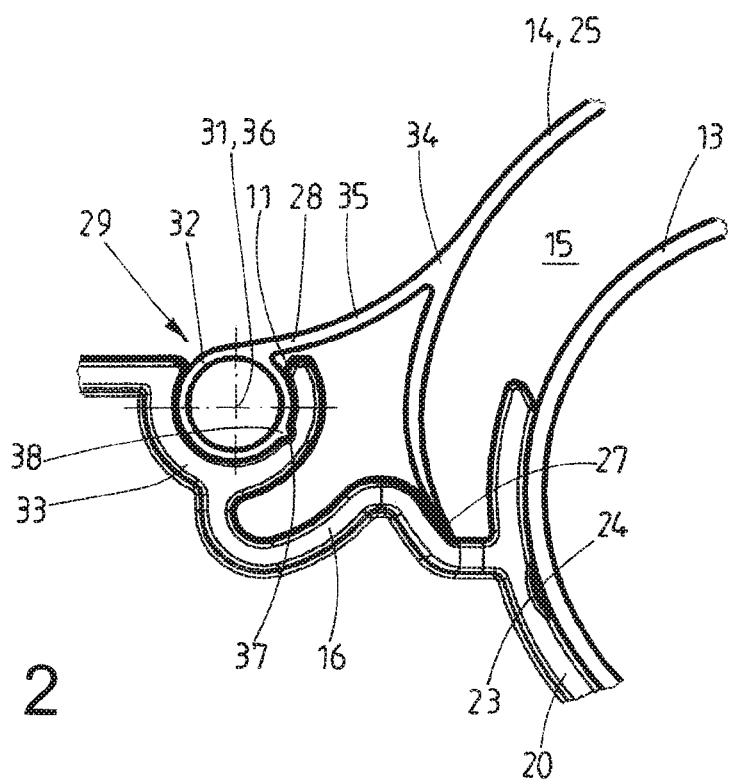
FIG. 2 is an enlarged detail II from the illustration of FIG. 1.

The device illustrated in the figures for air-conditioning stalls by means of cooling and/or humidifying the stall air is preferably arranged in the region of at least one upright wall of the stall. The device then replaces a wall of the stall at the location where it is arranged.

The device has a plurality of evaporation members 10 which are arranged one behind the other and which are preferably identical. The evaporation members 10 have flat parallelepipedal outlines. They are upright and arranged so as to be orientated longitudinally one behind the other preferably in the longitudinal direction of the stall. The evaporation members 10 have a large number of undulating plates or films of paper or plastics material. A large number of such films or plates is arranged one behind the other, wherein adjacent plates are connected to each other. As a result of the undulation of the plates or films, there is produced inside the evaporation members 10 a large number of channels which are preferably orientated alternately in opposing directions and which extend at least partially obliquely and through which the air which is intended to be air-conditioned flows in the direction towards the inner side of the stall. Furthermore, water flows, for example, small drops of water, in the manner of a water mist from the top to the bottom through the evaporation members 10. The evaporation members 10 rest on a water-permeable grid-like cover which is arranged at the top on a water collection channel. The cover which is not shown in the figures and the water collection channel extend in a state orientated longitudinally below the sequential evaporation members 10.

In the embodiment shown, a single spray pipe 13 is arranged above the evaporation members 10. However, a plurality of, preferably two, spray pipes 13 which are arranged beside each other may be arranged above the evaporation members 10. In the figures, a cylindrical spray pipe 13 is illustrated. However, spray pipes 13 with different cross-sections, for example, semi-circular, triangular or rectangular cross-sections, are also conceivable. A single continuous deflector 14 or a plurality of sequential coherent deflectors 14 are associated with the spray pipe 13. The at least one deflector 14 is arranged above the spray pipe 13, with spacing from the spray pipe 13. A space 15 is thereby formed between the spray pipe 13 and the at least one deflector 14.

The at least one deflector 14 and the at least one spray pipe 13 are secured to a plurality of evaporation members 10 which are sequential in the longitudinal direction of the row with narrow or short retention members 16 which are sequential with preferably uniform spacing. A plurality of retention members 16 which are sequential with spacing in the longitudinal direction of the spray pipe 13 and deflector 14 thus carry together the spray pipe 13 and the at least one deflector 14 which is arranged thereabove.

Two edge strips 18 which extend with spacing parallel with each other are provided between the lower sides of the retention members 16 and an upper, preferably horizontal, longitudinally orientated end wall 17 of the sequential evaporation members 10. The edge strips 18 which are constructed identically and orientated in opposing directions in a mirror-inverted manner extend over parallel upper corner regions 19 at opposing edges of the upper end wall 17 of the evaporation members 10 which are arranged one behind the other and are preferably below the corner regions 19 clamped from the outer side to opposing longitudinal side faces of the evaporation members 10. At the upper side, the edge strips 18 are connected to each other in a clamping and/or locking manner by means of retention members 16 which are spaced apart in the longitudinal direction.

In the following description, for the sake of clarity, an evaporation member 10, a spray pipe 13 and a deflector 14 are always mentioned without the invention being intended to be limited thereto. Generally, a plurality of evaporation members 10 and deflectors 14 are arranged one after the other in the longitudinal direction of the device. A plurality of spray pipes 13 may also be provided one behind the other and/or beside each other.

Figure 3:
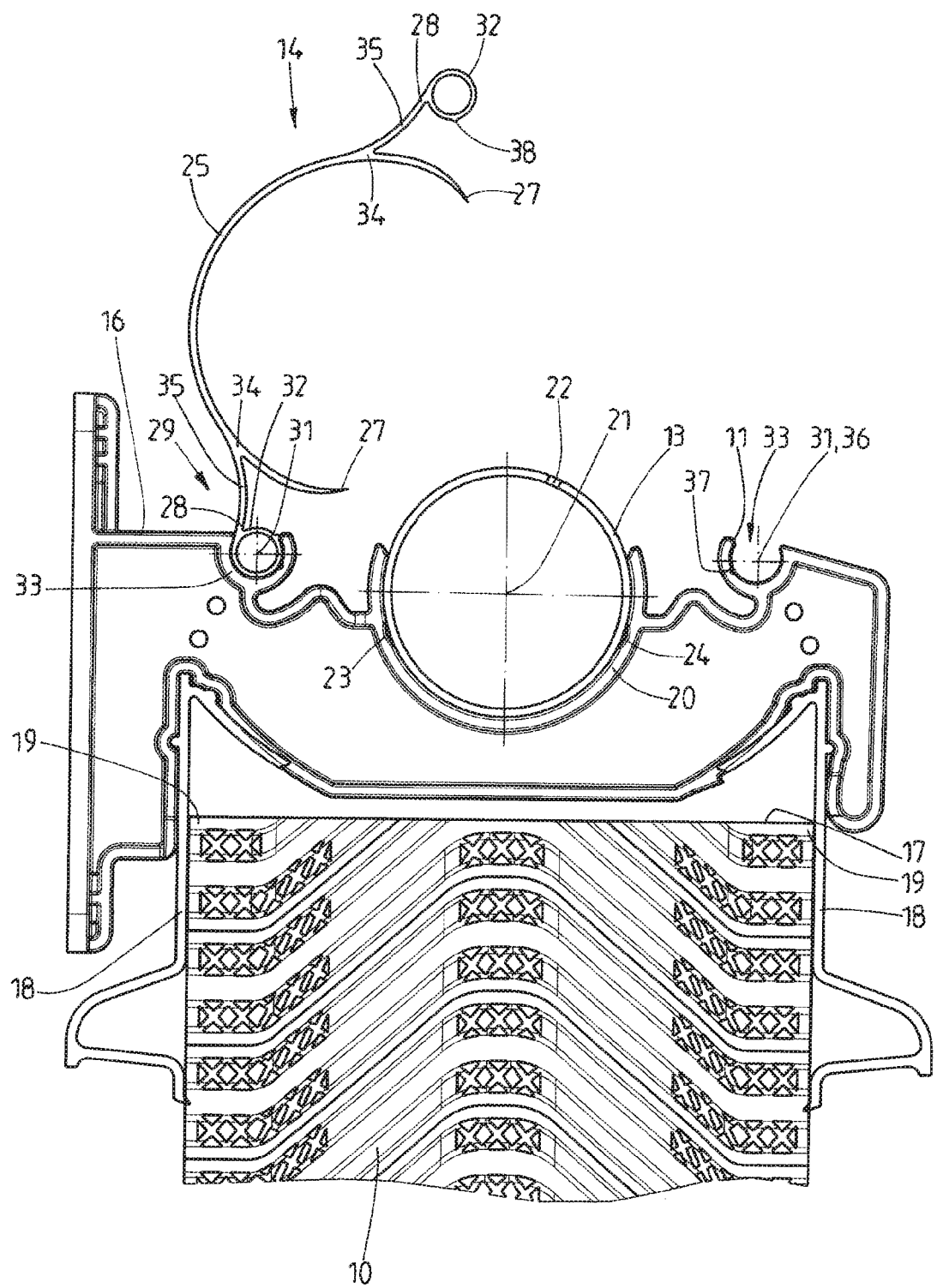
FIG. 3 is an illustration similar to FIG. 1 with a deflector pivoted upwards about a longitudinal edge region and locked.

Each of the retention members 16 which are constructed identically has at the upper side in the center a locking recess 20. The inner, partially cylindrical wall of the locking recess 20 surrounds more than the lower half of the outer covering face of the cylindrical spray pipe 30. In the embodiment shown, the locking recess 20 surrounds the outer covering face of the spray pipe 13 by approximately from 200° to 250°. In this instance, the spray pipe 13 can be connected in a locking manner to each retention member 16. In this case, the locking recess 20 concentrically surrounds a longitudinal center axis 21 of the spray pipe 13. In this instance, an upper portion of the spray pipe 13, around which the locking recess 20 does not extend, remains free. In this free upper portion, the spray pipe 14 has a large number of openings 22 or nozzles which are preferably distributed in accordance with a uniform pattern. FIGS. 1 and 3 illustrate, for reasons of clarity, only one of the many openings 22 or nozzles with a radially directed orientation in the wall of the upper region of the spray pipe 13 left free by the locking recess 20.

The openings 22 or nozzles which are directed starting from the longitudinal center axis 21 of the spray pipe 13 radially with respect to the concave-curved inner side of the deflector 14 inject or spray water from below against the concave inner side or lower side of the deflector 14. This water runs down at the inner side of the deflector 14, at both sides. A portion of the water drips down at the regions of opposing longitudinal edges 27 of the deflector 14 between adjacent retention members 16, where it strikes the upper end walls 17 of the evaporation members 10 at opposing locations from above. Another portion of the water which flows away downwards on the concave-curved inner side of the deflector 14 at both sides reaches between the retention members 16 a lower portion of the spray pipe 13, on which the water flows away downwards and drips off substantially at the center below the spray pipe 13 and then approximately centrally strikes the upper horizontal end wall 17 of the respective evaporation member 10. In the manner described above, there is produced a water supply to the upper end wall 17 of the evaporation members 10 at different locations, whereby a uniformly distributed introduction of the water arriving from the at least one spray pipe 13 via the upper end wall 17 into the evaporation members 10 is achieved. This leads to a homogeneous distribution of the water flowing downwards from the top to the bottom over the entire evaporation members 10, in particular the cross-sections thereof.

In the device illustrated in this instance, the locking recess 20 of each retention member 16 has two opposing groove-like recesses 23 which are continuous in the longitudinal direction. Corresponding flat beads 24 are provided on the outer cylindrical covering face of the spray pipe 13. The beads 24 preferably extend continuously in the longitudinal direction of the spray pipe 13. As a result of the beads 24 of the spray pipe 13 which engage in the recesses 23 of the locking recess 20, the spray pipe 13 is connected to the respective retention member 16 so as not to be able to be rotated about the longitudinal center axis 21 thereof.

The deflector 14 which is arranged with spacing above the spray pipe 13 extends in a longitudinal direction of the spray pipe 13. The deflector 14 has an elongate main body 25 having a part-circular cross-section. The deflector 14 which is arranged with spacing above the spray pipe 14 thereby covers with the central main body 25 thereof the upper portion of the spray pipe 13 and the upper part-regions of the spray pipe 13 which are left free by the locking recesses 20 of the retention members 16. A longitudinal center axis 26 of the main body 25 of the deflector 14 which is from two-thirds-circular to semi-circular in cross-section is located slightly above the longitudinal center axis 21 of the spray pipe 13. The width of a space 15 between the main body 25 of the deflector 14 and the spray pipe 13 starting from a vertical longitudinal center plane through the longitudinal center axes 21 and 26 one above the other thereby decreases continuously at opposing sides of the space 15. The part-circular region of the main body 25 is selected in such a manner that the longitudinal edges 27 thereof which are located at the same height and which extend parallel with each other are supported at opposing sides beside the locking recess 20 of the respective retention member 16. The spacing of the main body 25 of the deflector 14 from the spray pipe 13 and consequently the cross-section of the space 15 between the spray pipe 13 and the deflector 14 is thereby determined.

In the embodiment shown, the wall of the main body 25 of the deflector 14 tapers continuously towards the longitudinal edges 27 so that end regions of the main body 25 extending from the longitudinal edges 27 are flexible and resiliently deformable.

The entire deflector 14 can be pivoted in the manner of a hinge relative to the retention members 16. In the embodiment shown, the deflector 14 can be pivoted about two hinge connections 29, 30 which are distributed over the opposing longitudinal edge regions 28 thereof. The hinge connections 29, 30 are in this instance constructed identically, but orientated in a mirror-inverted manner. Both hinge connections 29, 30 extend parallel with each other at opposing sides of the longitudinal center axis 26 of the deflector 14. The spacings of the hinge connections 29, 30 with respect to the longitudinal center axis 26 are identical in the deflector 14 shown in this instance. Both hinge connections 29, 30 are releasable. Preferably, the hinge connections 29, 30 are releasable locking connections.

Figure 5:
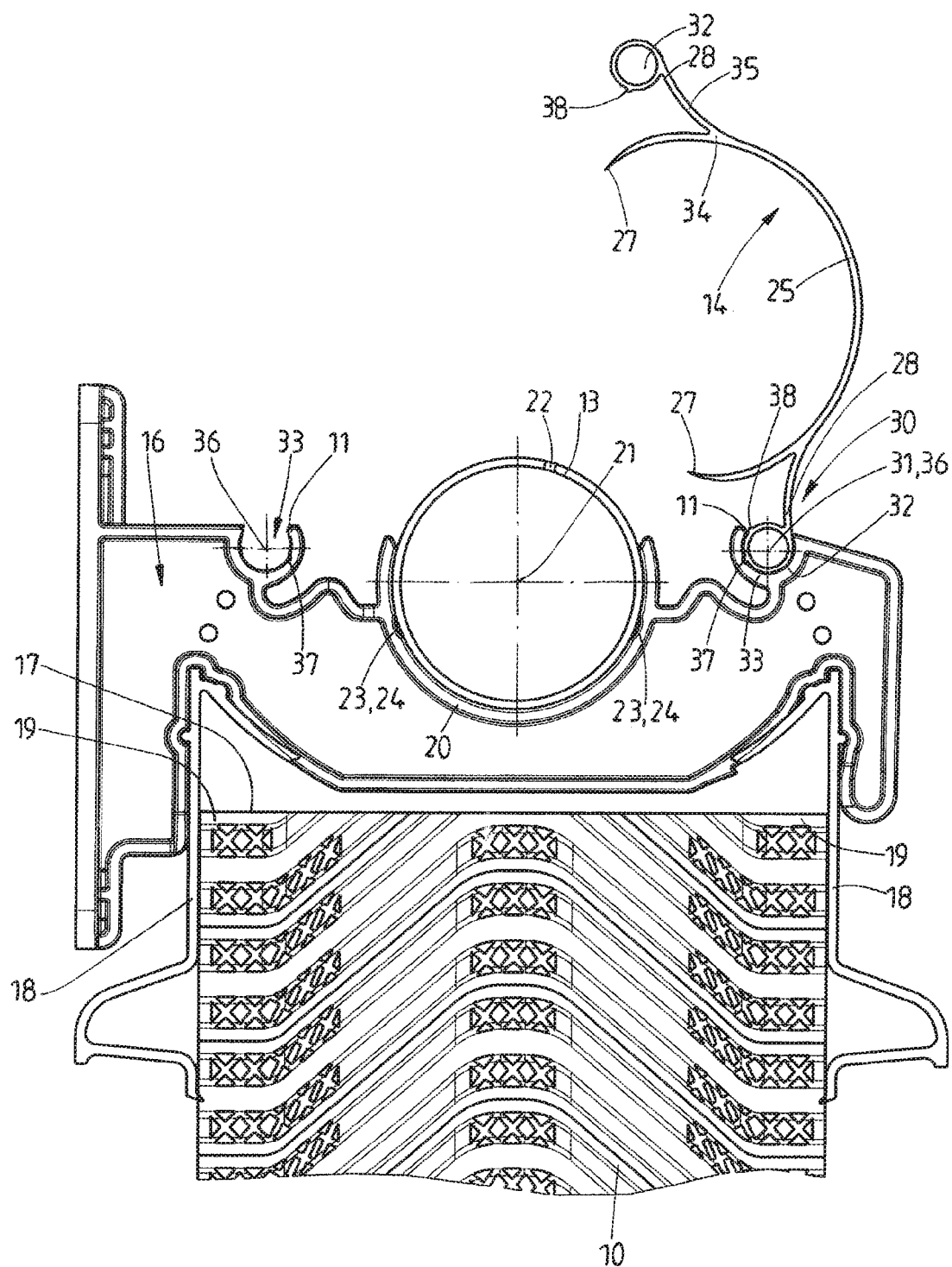
FIG. 5 is an illustration similar to FIGS. 1 and 3 with a deflector pivoted upwards about an opposing longitudinal edge region.

In the device shown in this instance, one of the locking connections 29, 30 can optionally be released so that the deflector 14 can be pivoted about the other or opposing unopened hinge connection 29 or 30, respectively. A pivot axis 31 of each hinge connection 29, 30 extends parallel with the longitudinal center axis 26 of the deflector 14 and the longitudinal center axis 21 of the spray pipe 13. When pivoted about the desired pivot axis 31, that is to say, optionally the pivot axis 31 of the hinge connection 29 or the pivot axis 31 of the hinge connection 30, the deflector 14 is thereby pivoted, as illustrated, on the one hand, in FIG. 3 and, on the other hand, in FIG. 5. In this instance, the space 15 between the spray pipe 13 and the deflector 14 is opened, for example, to clean the spray pipe 13 and the deflector 14.

Each hinge connection 29, 30 is in the same manner formed by a cylindrical longitudinal edge profile 32 associated with the deflector 14 on a longitudinal edge region 28 of the deflector 14 and a corresponding receiving pocket 33 of each retention member 16. The receiving pockets 33 are associated with the retention members 16 at opposing sides of the locking recesses 20 thereof. As a result of the identically constructed hinge connections 29 and 30, the same reference numerals are used for the cylindrical longitudinal edge profile 32 and the receiving pocket 33 of both hinge connections 29 and 30. The receiving pockets 33 surround the lower side of the cylindrical longitudinal edge profile 32 in a range greater than 180°, preferably from 200° to 250°. The respective cylindrical longitudinal edge profile 32 can thereby be pressed in a locking manner into the associated receiving pocket 33 and with resilient expansion of the receiving pocket 33 also be removed from it again in order to release the desired hinge connection 29 or 30 in order to fold open the deflector 14.

At opposing sides of the main body 25 of the deflector 14 there are branches 34 for a laterally protruding wing 35 of the deflector 14 in each case. Each branch 34 is in the same manner approximately 60° away from the vertical longitudinal centre plane of the deflector 14. At the outer ends of the wings 35, the cylindrical longitudinal edge profiles 32 are arranged in such a manner that they are located below the ends of the wings 35. Longitudinal center axes 36 of both cylindrical longitudinal edge profiles 32 which coincide with or form the pivot axes 31 are thereby located on a common horizontal longitudinal centre plane through the longitudinal center axis 26 of the main body 25 of the deflector 14. It is thus possible to engage the cylindrical longitudinal edge profiles 32 in the receiving pockets 33.

In each of the two receiving pockets 33 of each retention member 16 there is a groove-like recess 37. The respective recess 37 extends continuously parallel with the respective longitudinal center axis 36 of the cylindrical longitudinal edge profile 32 which engages in the receiving pocket 33. A bead 38 which corresponds to the recess 37 is arranged at the outer side on each cylindrical longitudinal edge profile 32. The respective elongate bead 38 extends continuously in a longitudinal direction of each cylindrical longitudinal edge profile 32, that is to say, parallel with the longitudinal center axis 36 of the respective cylindrical longitudinal edge profile 32.

Figure 4:
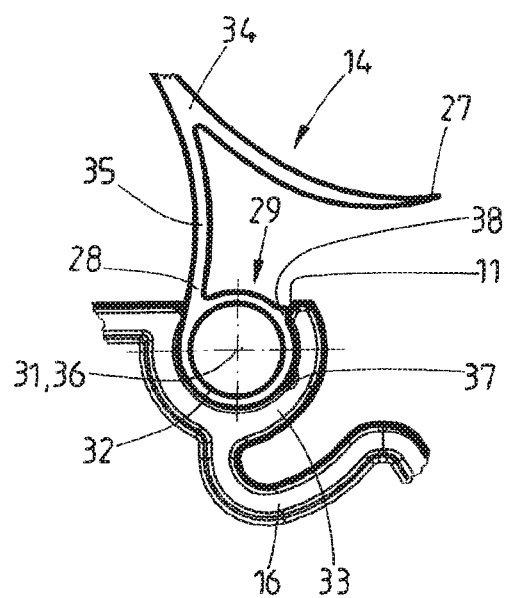
FIG. 4 is an enlarged detail IV from FIG. 3.

The arrangement of the beads 38 on the cylindrical longitudinal edge profiles 32 and the recesses 37 of the receiving pockets is provided in such a manner that, in the operating position of the deflector 14, when it closes the space 15 over the spray pipe 13, the beads 38 of both cylindrical longitudinal edge profiles 32 engage in the recesses 37 in each receiving pocket 33 (FIG. 1). If, in contrast, the deflector 14 is folded upwards (FIGS. 3 and 5), the bead 38 of the cylindrical longitudinal edge profile 32 is in abutment in the hinge connection 29 or 30 which remains closed at the outer side in front of a longitudinal edge 11 of the respective receiving pocket 33 of the hinge connection 29 or 30 which has remained closed (FIG. 4). On the respective hinge connection 29 or 30 which has remained closed, the deflector 14 is thereby locked in the open position thereof in a positive-locking manner by means of a support of the bead 38 of the deflector 14 on the longitudinal edge 11 of the receiving pocket 33 of the retention member 16 associated with the deflector 14, which receiving pocket is occupied by the cylindrical longitudinal edge profile 32. The deflector 14 is thus secured against undesirable further pivoting open or pivoting back into the operating position thereof which closes the space 15.

Preferably, at least the spray pipe 13, the deflector 14, the retention members 16 and the edge strips 18 of the device are formed from plastics material, in particular thermoplastic plastics material, and with the exception of the retention members 16 produced by means of extrusion. The retention members 16 are preferably produced using an injection-moulding method. Furthermore, the main body 25, the wings 35 and the cylindrical longitudinal edge profiles 32 of the deflector 14 are integrally connected so that the entire deflector 14 can be produced in one piece, preferably by means of extrusion.

LIST OF REFERENCE NUMERALS

10 Evaporation member
11 Longitudinal edge
13 Spray pipe
14 Deflector
15 Space
16 Retention member
17 End wall
18 Edge strip
19 Corner region
20 Locking recess
21 Longitudinal center axis
22 Opening
23 Recess
24 Bead
25 Main body
26 Longitudinal center axis
27 Longitudinal edge
28 Longitudinal edge region
29 Hinge connection
30 Hinge connection
31 Pivot axis
32 Cylindrical longitudinal edge profile
33 Receiving pocket
34 Branch
35 Wing
36 Longitudinal centre axis
37 Recess
38 Bead

What is claimed is:

1. A device for air-conditioning stalls, in particular for cooling and/or humidifying stall air with evaporation members, at least one spray pipe which is arranged thereabove and which can be supplied with fluid, at least one deflector above the at least one spray pipe, and retention members for the at least one spray pipe and the at least one deflector above the evaporation members, comprising:

releasable hinge connections,
wherein the at least one deflector is securable to the retention members with opposing longitudinal edge regions of the at least one deflector by means of two of the releasable hinge connections, and wherein the releasable hinge connections are constructed to pivot a respective one of the at least one deflector relative to the retention members which carry the respective one of the at least one deflector, and wherein the at least one deflector is pivotable relative to the retention members about one of the releasable hinge connections at the opposing longitudinal edge region of the at least one deflector.

2. The device according to claim 1, wherein the releasable hinge connections are at least constructed identically to each other.

3. The device according to claim 1, wherein the releasable hinge connections are constructed at the same time as locking connections and pivot connections.

4. The device according to claim 1, wherein, in order to form a movable portion of each of the releasable hinge connections, a cylindrical longitudinal edge profile is associated with at least one of the longitudinal edge regions of the respective one of the at least one deflector.

5. The device according to claim 4, wherein a fixed portion of the at least one of the releasable hinge connections is formed by a respective one of the retention members.

6. The device according to claim 5, wherein the respective one of the retention members has receiving pockets which are located at opposing sides of the at least one spray pipe for a portion of the cylindrical longitudinal edge profile of the respective one of the at least one deflector, which portion of the cylindrical longitudinal edge profile is located in the region of the respective one of the retention members.

7. The device according to claim 6, wherein the cylindrical longitudinal edge profile of the respective one of the at least one deflector is constructed to correspond to at least one of the receiving pockets of the respective one of the retention members in such a manner that the cylindrical longitudinal edge profile is supported so as to be able to be pivoted about a longitudinal center axis thereof in the associated corresponding one of the at least one of the receiving pockets.

8. The device according to claim 6, wherein the cylindrical longitudinal edge profile of the respective one of the at least one deflector is constructed to correspond to at least one of the receiving pockets of the respective one of the retention members in such a manner that the cylindrical longitudinal edge profile can be pressed into the associated at least one of the receiving pockets of the respective one of the retention members in a locking manner and released from the associated at least one of the receiving pockets again.

9. The device according to claim 1, wherein the respective one of the at least one deflector is lockable at least in the state pivoted upwards.

10. The device according to claim 9, wherein the respective one of the at least one deflector is lockable at least in the state pivoted upwards by means of locking in the region of at least one of the releasable hinge connections.

11. The device according to claim 9, wherein the locking of the respective one of the deflector at least in the state folded upwards is carried out at or in the at least one of the releasable hinge connections which acts as a hinge when the respective one of the at least one deflector is pivoted.

12. The device according to claim 6, wherein each of the releasable hinge connections has at least one bead on the cylindrical longitudinal edge profile and at least one recess which corresponds to the at least one bead in the or each of the at least one of the receiving pockets of the retention members.

* * * * *